US012452594B2

(12) United States Patent
Okawa

(10) Patent No.: US 12,452,594 B2
(45) Date of Patent: Oct. 21, 2025

(54) ACTIVE NOISE CONTROL DEVICE, ACTIVE NOISE CONTROL METHOD, AND ACTIVE NOISE CONTROL PROGRAM

(71) Applicant: TRANSTRON INC., Yokohama (JP)

(72) Inventor: Ryota Okawa, Yokohama (JP)

(73) Assignee: TRANSTRON INC., Yokohama (JP)

( * ) Notice: Subject to any disclaimer, the term of this patent is extended or adjusted under 35 U.S.C. 154(b) by 198 days.

(21) Appl. No.: 18/283,159

(22) PCT Filed: Feb. 18, 2022

(86) PCT No.: PCT/JP2022/006685
§ 371 (c)(1),
(2) Date: Sep. 20, 2023

(87) PCT Pub. No.: WO2022/202018
PCT Pub. Date: Sep. 29, 2022

(65) Prior Publication Data
US 2024/0179463 A1 May 30, 2024

(30) Foreign Application Priority Data
Mar. 24, 2021 (JP) ................................ 2021-050005

(51) Int. Cl.
*G10K 11/178* (2006.01)
*H04R 3/04* (2006.01)

(52) U.S. Cl.
CPC ........... *H04R 3/04* (2013.01); *H04R 2400/01* (2013.01)

(58) Field of Classification Search
CPC ................ G10K 2210/1282; G10K 11/17584
See application file for complete search history.

(56) References Cited

U.S. PATENT DOCUMENTS

2008/0095383 A1* 4/2008 Pan .................. G10K 11/17883 381/71.11
2013/0044891 A1 2/2013 Obata et al.
(Continued)

FOREIGN PATENT DOCUMENTS

JP H06-230791 A 8/1994
JP 3405752 B2 5/2003
(Continued)

OTHER PUBLICATIONS

European Patent Office, "Extended European Search Report for European Application No. 22774818.3," Jul. 12, 2024, 5 pp.
(Continued)

*Primary Examiner* — James K Mooney
(74) *Attorney, Agent, or Firm* — HAUPTMAN HAM, LLP

(57) ABSTRACT

An active noise control device includes an adaptive filter that generates a control signal based on a vibration frequency generated by a vibration source and sequentially updating the adaptive filter, a reference signal generation device that generates a reference signal, an amplitude characteristic calculation device that acquires an acoustic characteristic including amplitude and phase information, the acoustic characteristic being an acoustic characteristic of a secondary path between a speaker and a microphone and calculating an amplitude characteristic of the secondary path, a smoothed signal generation device having a low-pass filter, a correction coefficient calculation device that calculates a correction coefficient according to a frequency, an adaptive filter update device that updates the adaptive filter by subtracting an update term including the correction coefficient from a first adaptive filter coefficient that is an immediately preceding adaptive filter coefficient, and a
(Continued)

control signal generation device that generates the control signal.

6 Claims, 7 Drawing Sheets

(56) References Cited

U.S. PATENT DOCUMENTS

| | | | | |
|---|---|---|---|---|
| 2013/0136269 | A1 | 5/2013 | Sakamoto et al. | |
| 2013/0279712 | A1* | 10/2013 | Nohara ............ | G10K 11/17857 381/71.11 |
| 2014/0270223 | A1 | 9/2014 | Li et al. | |
| 2015/0356965 | A1 | 12/2015 | Tani et al. | |
| 2016/0314778 | A1* | 10/2016 | Christoph ........ | G10K 11/17854 |
| 2019/0019493 | A1 | 1/2019 | Yano | |
| 2021/0225353 | A1* | 7/2021 | Wang ............... | G10K 11/17883 |

FOREIGN PATENT DOCUMENTS

| | | | |
|---|---|---|---|
| JP | 2010012813 | A | 1/2010 |
| JP | 2011-123330 | A | 6/2011 |
| WO | 2011-101967 | A1 | 8/2011 |
| WO | 2014/115533 | A1 | 7/2014 |
| WO | 2017/138094 | A1 | 8/2017 |

OTHER PUBLICATIONS

PCT/ISA/210, "International Search Report for PCT International Application No. PCT/JP2022/006685," May 17, 2022.

Japan Patent Office, "Notice of Reasons for Refusal" for Japanese Patent Application No. 2021-050005, Mailed on Oct. 8, 2024, 4 pp.

* cited by examiner

ACTIVE NOISE CONTROL DEVICE, ACTIVE NOISE CONTROL METHOD, AND ACTIVE NOISE CONTROL PROGRAM

RELATED APPLICATIONS

The present application is National Phase of International Application No. PCT/JP2022/006685 filed Feb. 18, 2022, and claims priority from Japanese Application No. 2021-050005, filed Mar. 24, 2021, the disclosure of which is hereby incorporated by reference herein in its entirety.

TECHNICAL FIELD

The present invention relates to an active noise control device, an active noise control method, and an active noise control program.

BACKGROUND ART

There is known an active noise control (ANC) device that detects noise with a microphone and outputs a control sound having the same amplitude and opposite phase from a speaker to cancel out the noise. Patent Document 1 discloses an active vibration noise control device that changes a step size parameter used for updating a filter coefficient in one or more filter coefficient updating means among a plurality of filter coefficient updating means when a vibration noise frequency is in a dip band.

CITATION LIST

Patent Documents

Patent Document 1: International Publication No. 2011/101967

SUMMARY OF THE INVENTION

Technical Problem

In the invention described in Patent Document 1, a dip is detected based on an average amplitude of a frequency band to be controlled, but a dip may not be accurately detected when there are a plurality of dips or when an overall amplitude characteristic is not constant.

The present invention has been made in view of such circumstances, and an object thereof is to provide an active noise control device, an active noise control method, and an active noise control program capable of accurately detecting the frequency of a dip and stably controlling noise even when the frequency of the noise matches the frequency of the dip.

Solution to Problem

In order to solve the above problem, an active noise control device according to the present invention is, for example, an active noise control device including an adaptive filter that generates a control signal by performing signal processing on a reference signal generated based on a vibration frequency generated by a vibration source, and sequentially updating the adaptive filter based on a signal input from a microphone when the control signal is output from a speaker, the active noise control device including a reference signal generation unit that generates the reference signal; an amplitude characteristic calculation unit that acquires an acoustic characteristic including amplitude and phase information, the acoustic characteristic being an acoustic characteristic of a secondary path between the speaker and the microphone, and calculates an amplitude characteristic of the secondary path having a different value according to a frequency based on the acquired acoustic characteristic;

a smoothed signal generation unit that smooths the amplitude characteristic using a low-pass filter and generates a smoothed signal having a different value according to a frequency; a correction coefficient calculation unit that calculates a correction coefficient having a different value according to a frequency based on a result of dividing the amplitude characteristic by the smoothed signal; an adaptive filter update unit that updates the adaptive filter by subtracting an update term including the correction coefficient from a first adaptive filter coefficient that is an immediately preceding adaptive filter coefficient to obtain a second adaptive filter coefficient; and a control signal generation unit that generates the control signal by multiplying the reference signal by the second adaptive filter coefficient.

In order to solve the above problem, an active noise control method according to the present invention is, for example, an active noise control method using an adaptive filter that generates a control signal by performing signal processing on a reference signal generated based on a vibration frequency generated by a vibration source, and sequentially updating the adaptive filter based on a signal input from a microphone when the control signal is output from a speaker, the active noise control method including the steps of: acquiring an acoustic characteristic including amplitude and phase information, the acoustic characteristic being an acoustic characteristic of a secondary path between the speaker and the microphone, and calculating an amplitude characteristic of the secondary path having a different value according to a frequency based on the acquired acoustic characteristic; smoothing the amplitude characteristic using a low-pass filter and generating a smoothed signal having a different value according to a frequency; calculating a correction coefficient having a different value according to a frequency based on a result of dividing the amplitude characteristic by the smoothed signal; updating the adaptive filter by subtracting an update term including the correction coefficient from a first adaptive filter coefficient that is an immediately preceding adaptive filter coefficient to obtain a second adaptive filter coefficient; and generating the control signal by multiplying the reference signal by the second adaptive filter coefficient.

In order to solve the above problem, an active noise control program according to the present invention is, for example, an active noise control program including an adaptive filter that generates a control signal by performing signal processing on a reference signal generated based on a vibration frequency generated by a vibration source, and sequentially updating the adaptive filter based on a signal input from a microphone when the control signal is output from a speaker, the active noise control program causing a computer to function as a reference signal generation unit that generates the reference signal; an amplitude characteristic calculation unit that acquires an acoustic characteristic including amplitude and phase information, the acoustic characteristic being an acoustic characteristic of a secondary path between the speaker and the microphone, and calculates an amplitude characteristic of the secondary path having a different value according to a frequency based on the acquired acoustic characteristic; a smoothed signal generation unit that smooths the amplitude characteristic using a low-pass filter and generates a smoothed signal having a different value according to a frequency; a correction coefficient calculation unit that calculates a correction coefficient having a different value according to a frequency based on a result of dividing the amplitude characteristic by the smoothed signal; an adaptive filter update unit that updates the adaptive filter by subtracting an update term including the correction coefficient from a first adaptive filter coefficient that is an immediately preceding adaptive filter coefficient to obtain a second adaptive filter coefficient; and a control signal generation unit that generates the control signal by multiplying the reference signal by the second adaptive filter coefficient.

Note that the computer program can be provided by being downloaded via a network such as the Internet, or can be provided by being recorded in various computer-readable recording media such as a CD-ROM.

In any one of the above aspects of the present invention, a correction coefficient is calculated based on a result obtained by dividing an amplitude characteristic of a secondary path calculated based on an acoustic characteristic of the secondary path between a speaker and a microphone by a smoothed signal obtained by smoothing the amplitude characteristic, and an update term including the correction coefficient is subtracted from an immediately preceding adaptive filter coefficient to update the adaptive filter. The reference signal generated based on the vibration frequency generated by the vibration source is multiplied by the updated adaptive filter coefficient to generate the control signal. Thus, the frequency of the dip is accurately detected, and the noise can be stably controlled even when the frequency of the noise matches the frequency of the dip.

A threshold may be set to approximately 0.5 to approximately 0.7, and the adaptive filter update unit may set the correction coefficient to 0 when the correction coefficient is less than or equal to the threshold. As a result, it is possible to stop the update of the adaptive filter at the dip frequency and perform the process in which stability is prioritized.

The adaptive filter update unit may subtract the update term from a result of multiplying the first adaptive filter coefficient by a coefficient of less than 1 to obtain the second adaptive filter coefficient. As a result, the adaptive filter coefficient can be gradually reduced, and unnaturalness can be eliminated.

The correction coefficient calculation unit may set a result of dividing the amplitude characteristic by the smoothed signal as the correction coefficient when the result is smaller than 1, and sets the correction coefficient to 1 when the result of dividing the amplitude characteristic by the smoothed signal is greater than or equal to 1. This ensures that the correction coefficient does not exceed 1 and that the correction process works in the direction of stabilization.

Advantageous Effects of Invention

According to the present invention, it is possible to accurately detect the frequency of the dip and to stably control the noise even when the frequency of the noise matches the frequency of the dip.

DESCRIPTION OF THE EMBODIMENTS

Hereinafter, an embodiment of an active noise control device according to the present invention will be described in detail with reference to the drawings. The active noise control device includes an adaptive filter that generates a control signal by performing signal processing on a reference signal generated based on a vibration frequency generated by a vibration source, and sequentially updates the adaptive filter based on a signal input from a microphone when a control signal is output from a speaker. Hereinafter, the present invention will be described using an example in which noise called booming noise generated by resonance of vibration of an engine of an automobile in a vehicle interior is suppressed, but the active noise control device of the present invention is not limited to a mode in which booming noise is suppressed.

Figure 1:
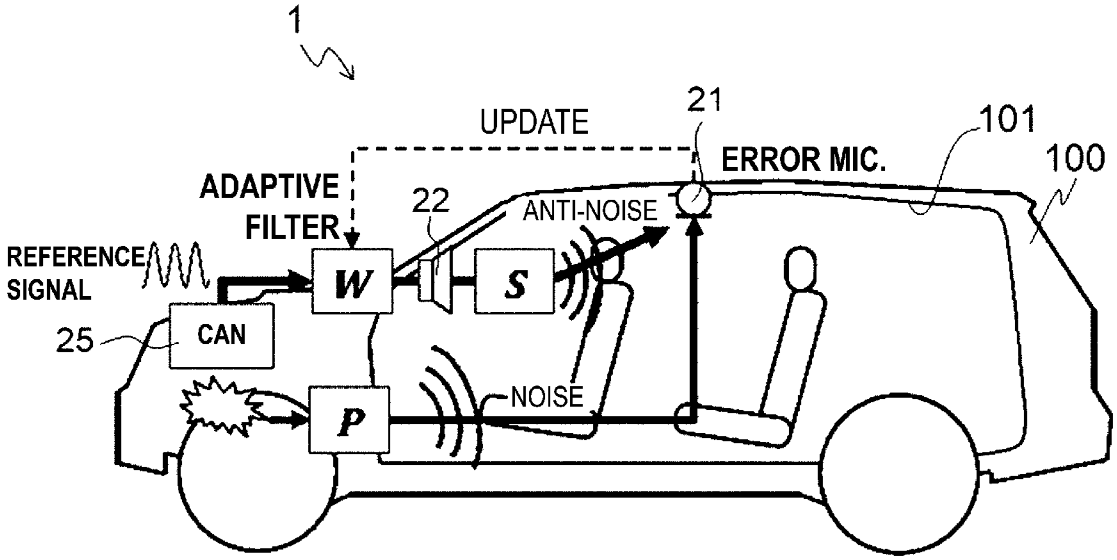
FIG. 1 is a diagram schematically illustrating a vehicle 100 provided with an active noise control device 1 according to a first embodiment.

FIG. 1 is a diagram schematically illustrating a vehicle 100 provided with an active noise control device 1 according to a first embodiment. The active noise control device 1 is connected to a microphone 21, a speaker 22, a control area network (CAN) 25, and the like provided in the vehicle 100. The microphone 21 and the speaker 22 are provided in a vehicle interior 101 of the vehicle 100. In particular, the microphone 21 is desirably provided at a position close to the ears of the passenger, such as the ceiling of the vehicle interior 101.

In FIG. 1, P is a transfer function (primary path) from a noise source (engine) to the microphone 21, and S is a transfer function (secondary path) from the speaker 22 to the microphone 21. Furthermore, W is an adaptive filter for adjusting the phase and the amplitude.

An active noise control device 1 acquires information on an engine speed from a CAN 25, generates a sine wave (reference signal) having the same frequencies as those of a booming noise, generates a control signal by multiplying the reference signal by an adaptive filter coefficient, and outputs the control signal from a speaker 22. As a result, the booming noise caused by the vibration source (engine) and the sound output from the speaker 22 are input to the microphone 21. Then, the active noise control device 1 adjusts the phase and the amplitude of the reference signal by the adaptive filter W so that the sound detected by the microphone 21 becomes small.

The active noise control device 1 may be constructed as, for example, a dedicated board mounted on a communication terminal or the like (e.g., an in-vehicle device) in the vehicle 100. Furthermore, for example, the active noise control device 1 may be mainly configured by a computer system including an arithmetic device such as a central processing unit (CPU) for executing information processing, and a storage device such as a random access memory (RAM) and a read only memory (ROM), and software (active noise control program). The active noise control program may be stored in advance in an SSD (Solid State Drive) serving as a storage medium built in a device such as a computer, a ROM in a microcomputer having a CPU, or the like, and installed in the computer from there. Furthermore, the active noise control program may be temporarily or permanently stored (stored) in a removable storage medium such as a semiconductor memory, a memory card, an optical disk, a magneto-optical disk, or a magnetic disk.

Figure 2:
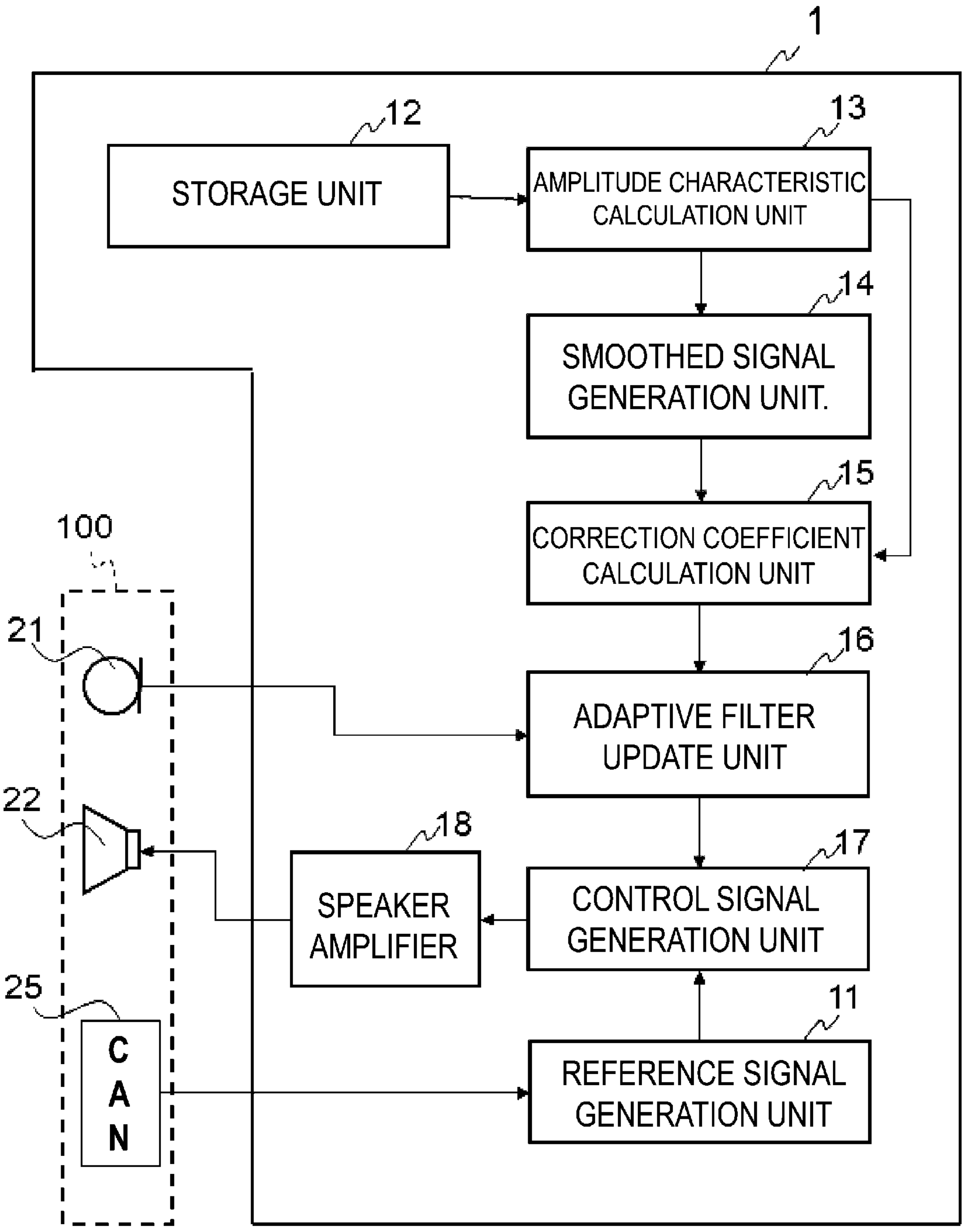
FIG. 2 is a block diagram illustrating an outline of a functional configuration of the active noise control device 1.

FIG. 2 is a block diagram illustrating an outline of a functional configuration of the active noise control device 1. The active noise control device 1 functionally includes, mainly, a reference signal generation unit 11, a storage unit 12, an amplitude characteristic calculation unit 13, a smoothed signal generation unit 14, a correction coefficient calculation unit 15, an adaptive filter update unit 16, a control signal generation unit 17, and a speaker amplifier 18. Note that the functional components of the active noise control device 1 may be classified into more components according to processing contents, or one component may execute processing of a plurality of components.

The reference signal generation unit 11 is a functional unit that acquires information on the engine speed from the CAN 25 and generates a reference signal. Hereinafter, a method by which the reference signal generation unit 11 generates a reference signal will be described. The reference signal generation unit 11 performs the following calculation at each sampling time t=0, 1, 2, . . . .

First, the reference signal generation unit 11 acquires information regarding the engine speed and the number of cylinders from the CAN 25, and acquires the frequency f(t) of the booming noise by the following equations (1) to (3). Note that (t) means a time-dependent signal.

$$\text{In the case of a four-cylinder engine: } f(t)=\text{engine speed}(t)/30 \quad (1)$$

$$\text{In the case of a six-cylinder engine: } f(t)=\text{engine speed}(t)/20 \quad (2)$$

$$\text{In the case of an 8-cylinder engine: } f(t)=\text{engine speed}(t)/15 \quad (3)$$

Next, the reference signal generation unit 11 generates a sine wave (reference sine wave) having the same frequency as that of the booming noise as a reference signal by using the following equation (4).

[Equation 1]

$$X_0(t)=\cos\,\Omega(t), X_1(t)=-\sin\,\Omega(t) \quad (4)$$

Note that Ω(t) indicates the phase of the reference sine wave and is updated by the following equation (5). Here, $f_s$ is a sampling frequency.

[Equation 2]

$$\Omega(t)=\Omega(t-1)+2\pi\frac{f(t)}{f_s} \quad (5)$$

The storage unit 12 is a functional unit that stores acoustic characteristics of the secondary path between the speaker 22 and the microphone 21. The acoustic characteristics of the secondary path are measured and calculated in advance before the active noise control device 1 performs processes, and the result is stored in the storage unit 12.

A method for obtaining the acoustic characteristics of the secondary path will now be described. The acoustic characteristic of the secondary path is obtained by an acoustic characteristic calculation unit (not shown). The acoustic characteristic calculation unit may be included in the active noise control device 1, or may be included in another information processing device connected to the active noise control device 1.

First, a sweep wave from 30 Hz to 200 Hz is sent from the speaker 22. The sweep wave y(t) at this time is expressed by the following equation (6).

[Equation 3]

$$y=X_0(t)=\cos\,\Omega(t) \quad (6)$$

Assuming that the observation signal of the microphone is d(t), the prediction signal is predicted as in the following equation (7). Where a(f) and b(f) are the acoustic characteristics of the secondary path. The acoustic characteristics a(f) and b(f) of the secondary path are coefficients of cos and sin, respectively, and contain amplitude and phase information of the secondary path. Note that (f) means that the signal is a frequency-dependent signal.

[Equation 4]

$$\text{Prediction signal } \hat{d}(t)=a(f)x_0(t)+b(f)x_1(t) \quad (7)$$

The acoustic characteristics a(f) and b(f) of the secondary path that minimize the prediction error are obtained by the LMS (Least mean squares) algorithm. The prediction error e(t) is obtained by the following equation (8), and the acoustic characteristics a(f) and b(f) of the secondary path are obtained by the following successive update equation (9).

[Equation 5]

$$e(t)=d(t)-\hat{d}(t) \quad (8)$$

[Equation 6]

$$a(f)\leftarrow a(f)+\mu e(t)x_0(t), b(f)\leftarrow b(f)+\mu e(t)x_1(t) \quad (9)$$

The storage unit 12 stores the acoustic characteristics a(f) and b(f) of the secondary path obtained by equation (9). The acoustic characteristics a(f) and b(f) of the secondary path are held in a table with the frequency as an argument. Note that, in the present embodiment, the acoustic characteristics a(f) and b(f) of the secondary path are obtained by the LMS algorithm, but the method of obtaining the acoustic characteristics a(f) and b(f) of the secondary path is not limited thereto, and various known methods such as discrete Fourier transformation of an impulse response can be used.

The amplitude characteristic calculation unit 13 is a functional unit that acquires the acoustic characteristic stored in the storage unit 12 and calculates the amplitude characteristic of the secondary path based on the acoustic characteristic. The amplitude characteristic A(f) of the secondary path is obtained by the following equation (10).

[Equation 7]

$$A(f)=\sqrt{a(f)^2+b(f)^2} \tag{10}$$

Figure 3:
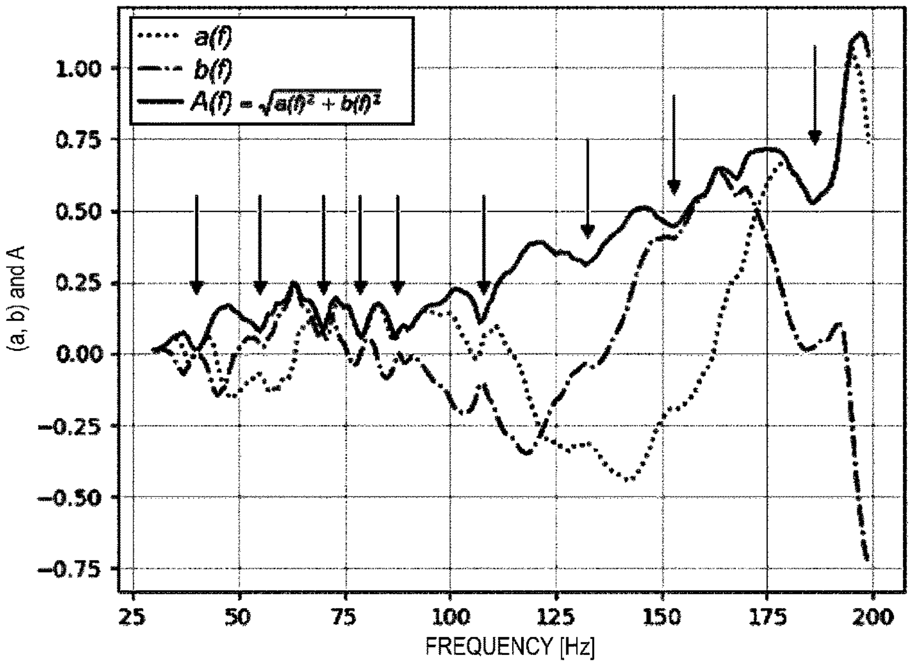
FIG. 3 is a graph illustrating an example of acoustic characteristics a(f) and b(f) of a secondary path and an amplitude characteristic A(f) of the secondary path.

FIG. 3 is a graph illustrating an example of acoustic characteristics a(f) and b(f) of the secondary path and an amplitude characteristic A(f) of the secondary path. In FIG. 3, the acoustic characteristics a(f) and b(f) of the secondary path are indicated by a dotted line and an alternate long and short dash line, and the amplitude characteristic A(f) of the secondary path is indicated by a solid line. In FIG. 3, the horizontal axis represents frequency, and the vertical axis represents amplitude. The acoustic characteristics a(f) and b(f) of the secondary path and the amplitude characteristic A(f) of the secondary path are frequency-dependent signals and have different values according to the frequency.

The vehicle interior is a closed space, and the amplitude characteristic A(f) of the secondary path is a standing wave having an antinode at which the sound pressure greatly changes and a node at which the sound pressure hardly changes. The amplitude characteristic A(f) of the secondary path becomes a dip (valley) at a position coinciding with a node of the standing wave. In FIG. 3, the dip is indicated by an arrow.

The description will now return to FIG. 2. The smoothed signal generation unit 14 is a functional unit that generates a smoothed signal A(f)' by smoothing the amplitude characteristic A(f) of the secondary path using a low-pass filter. The smoothed signal A(f)' is a signal that is dependent on the frequency and has a different value according to the frequency.

Figure 4:
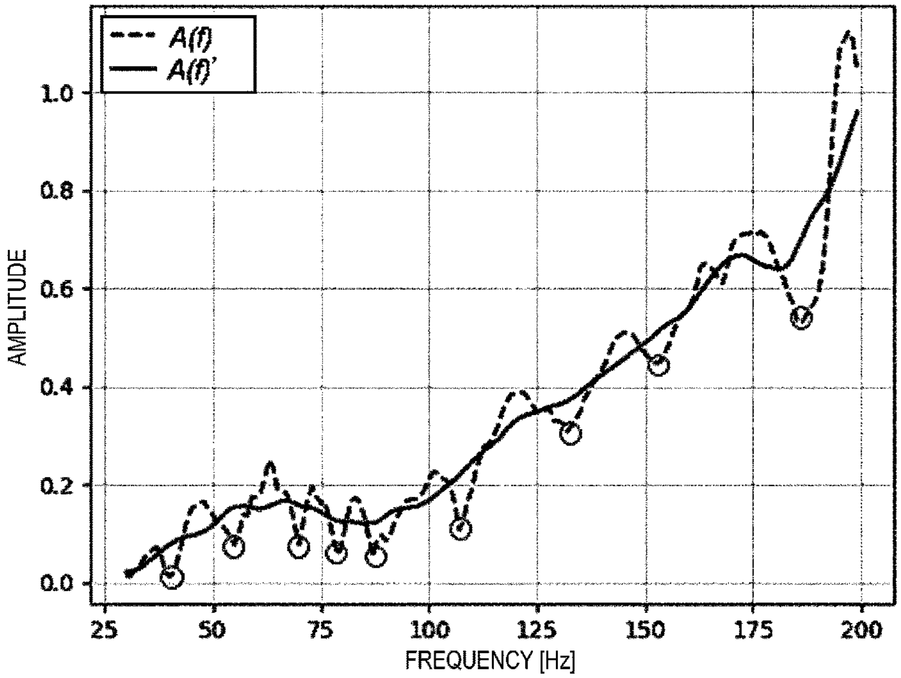
FIG. 4 is a graph showing an example of an amplitude characteristic A(f) of the secondary path and a smoothed signal A(f)'.

FIG. 4 is a graph showing an example of the amplitude characteristic A(f) of the secondary path and the smoothed signal A(f)'. In FIG. 4, the amplitude characteristic A(f) of the secondary path is indicated by a broken line and the smoothed signal A(f)' is indicated by a solid line. In FIG. 4, the horizontal axis represents frequency, and the vertical axis represents amplitude. The smoothed signal A(f)' is a smooth line without the unevenness of the amplitude characteristic A(f) of the secondary path.

The description will now return to FIG. 2. The correction coefficient calculation unit 15 is a functional unit that calculates a correction coefficient based on a result obtained by dividing the amplitude characteristic A(f) of the secondary path by the smoothed signal A(f)'. The correction coefficient α(f) is obtained by the following equation (11). The correction coefficient α(f) is a signal that depends on the frequency and has a different value according to the frequency.

[Equation 8]

$$\alpha(f)=\min\left\{\frac{A(f)}{A'(f)},1\right\} \tag{11}$$

As can be seen from equation (11), when the result obtained by dividing the amplitude characteristic A(f) of the secondary path by the smoothed signal A(f)' is greater than or equal to 1, the correction coefficient α(f) is set to 1.

Figure 5:
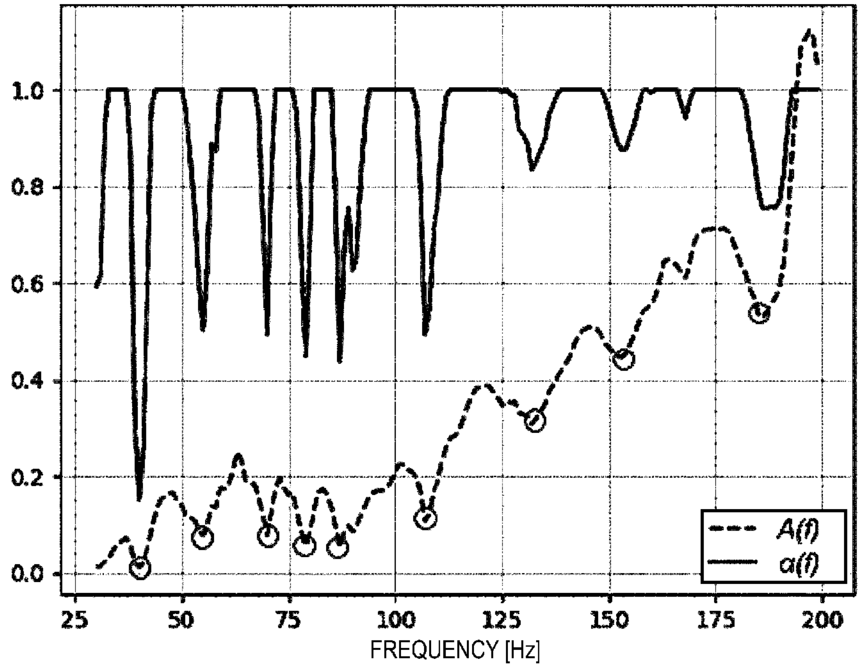
FIG. 5 is a graph illustrating a relationship between an amplitude characteristic A(f) of a secondary path and a correction coefficient α(f).

FIG. 5 is a graph illustrating a relationship between the amplitude characteristic A(f) of the secondary path and the correction coefficient α(f). In FIG. 5, a broken line indicates the amplitude characteristic A(f), and a solid line indicates the correction coefficient α(f). In a dip (a portion surrounded by ○), the amplitude characteristic A(f) of the secondary path becomes less than or equal to the smoothed signal A(f)', and the value of the correction coefficient α(f) becomes small. As a result, it is possible to accurately detect at which frequency a dip exists.

At the dip frequency, the active noise control becomes unstable due to reasons such as even if a loud sound is output from the speaker 22, it is not reflected in the input of the microphone 21, or a steep characteristic cannot be expressed by the adaptive filter, or the like, and in the worst case, the control signal output from the speaker 22 may become unlimitedly large and diverge. In the present embodiment, since the dip frequency can be reliably detected by using the result obtained by dividing the amplitude characteristic A(f) of the secondary path by the smoothed signal A(f)', such a problem can be prevented.

The description will now return to FIG. 2. The adaptive filter update unit 16 is a functional unit that updates the adaptive filter. In the present embodiment, the adaptive filter is updated based on the Filtered-x Normalized least mean squares filter (FxNLMS algorithm). The update of the adaptive filter will be described in detail below. Note that adaptive filters are well known, and thus description of the adaptive filter is omitted.

First, the adaptive filter update unit 16 obtains the filtered-x signals $X_0'(t)$ and $X_1'(t)$ using the acoustic characteristics a(f) and b(f) of the secondary path as shown in the following equation (12).

$$X'_0(t)=a(f)X_0(t)+b(f)X_1(t), X'_1(t)=a(f)X_1(t)+b(f)X_0(t) \tag{12}$$

Next, the adaptive filter update unit 16 acquires the signal e(t) input to the microphone 21, and updates the adaptive filter coefficients $w_0$ (t) and $w_1$ (t) using the filtered-x signals $X_0$ '(t) and $X_1$'(t) and the signal e(t) input to the microphone 21, as shown in the following equations (13) and (14).

[Equation 9]

$$w_0(t)=\gamma w_0(t-1)-\alpha(f)\mu\frac{e(t)}{A(f)}x_0'(t-1) \tag{13}$$

[Equation 10]

$$w_1(t)=\gamma w_1(t-1)-\alpha(f)\mu\frac{e(t)}{A(f)}x_1'(t-1) \tag{14}$$

That is, the adaptive filter update unit 16 subtracts the update term including the correction coefficient (the second term in equations (13) and (14)) from the immediately preceding adaptive filter coefficients $w_0$ (t−1) and $w_1$ (t−1) (corresponds to the first adaptive filter coefficient of the present invention). e(t)/A (f) in the update term indicates how much the sound is canceled, and when the sound is canceled well, the update term becomes small. In addition, μ in the update term is a step size and adjusts the speed of the update. The step size μ is a value greater than or equal to 0.

The present embodiment is characterized in that the update term includes a correction coefficient α(f). Since the correction coefficient α(f) becomes small at the dip frequency, the update of the adaptive filter is suppressed at the dip frequency.

In equations (13) and (14), γ is a leakage coefficient. In equations (13) and (14), in the first term, the immediately preceding adaptive filter coefficients $w_0$ (t−1), $w_1$ (t−1) is multiplied by the leakage coefficient γ. The leakage coefficient γ is a positive number less than 1, and is desirably close to 1, and is for example, 0.9997. The adaptive filter coefficient is prevented from becoming too large by setting the leakage coefficient γ to a positive number close to 1. It is not essential to multiply the immediately preceding adaptive filter coefficients $w_0$ (t−1) and $w_1$ (t−1) by the leakage coefficient γ.

The control signal generation unit 17 is a functional unit that generates the control signal y (t) by multiplying the reference signals $x_0$ (t) and $x_1$ (t) generated by equation (4) by the adaptive filter coefficients $w_0$ (t) and $w_1$ (t) (corresponds to the second adaptive filter coefficients of the present invention) after the update by equations (13) and (14). The control signal y(t) is a signal to be output to the speaker in order to cancel out noise (here, booming noise of the engine). The control signal generation unit 17 generates the control signal y(t) using the following equation (15).

[Equation 11]

$$y(t)=w_0(t)x_0(t)+w_1(t)x_1^{(t)} \quad (15)$$

The control signal generation unit 17 outputs the generated control signal to the speaker amplifier 18. The speaker amplifier 18 amplifies the control signal and outputs the amplified control signal to the speaker 22. Note that the speaker amplifier 18 is not essential.

Figure 6:
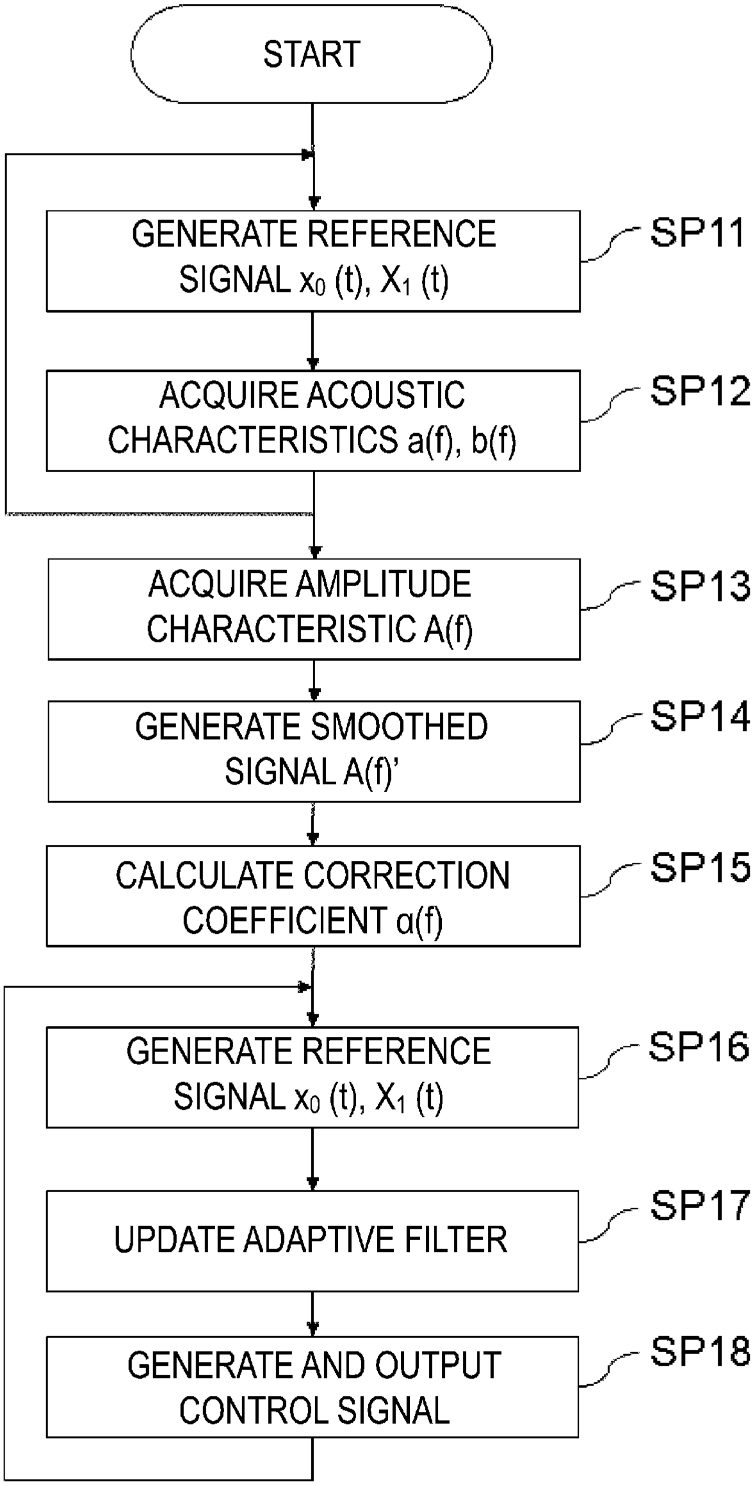
FIG. 6 is a flowchart illustrating a flow of processes performed by the active noise control device 1.

FIG. 6 is a flowchart illustrating a flow of processes performed by the active noise control device 1.

Acoustic Characteristic Measurement Process

First, the reference signal generation unit 11 generates a reference signal (step SP11), and the acoustic characteristic calculation unit (not shown) updates the acoustic characteristics a(f) and b(f) based on the reference signal (step SP12). When step SP12 is performed for the first time, the acoustic characteristics a(f) and b(f) are generated, and when step SP12 is performed for the second time or later, the acoustic characteristics a(f) and b(f) are updated. Since the sweep wave is used in the acoustic characteristic measurement process, the frequencies of the reference signals in step SP11 change from moment to moment. Therefore, the acoustic characteristics in the case of various frequencies, that is, the acoustic characteristics a(f) and b(f) that depend on the frequencies can be obtained by repeatedly performing the processes of steps SP11 and SP12. The acoustic characteristics a(f) and b(f) obtained in step SP12 are stored in the storage unit 12.

Correction Coefficient Calculation Process

The amplitude characteristic calculation unit 13 calculates the amplitude characteristic A(f) of the secondary path based on the acoustic characteristic stored in the storage unit 12 (step SP13). Next, the smoothed signal generation unit 14 smooths the amplitude characteristic A(f) of the secondary path to generate a smoothed signal A(f)' (step SP14). Then, the correction coefficient calculation unit 15 calculates the correction coefficient α(f) based on the result obtained by dividing the amplitude characteristic A(f) of the secondary path by the smoothed signal A(f)' (step SP15).

ANC Process

The reference signal generation unit 11 generates a reference signal based on the engine speed acquired from the CAN 25 (step SP16). Next, the adaptive filter update unit 16 acquires the signal e(t) input to the microphone 21, and updates the adaptive filter by subtracting the update term including the correction coefficient α(f) from the immediately preceding adaptive filter coefficient (step SP17).

Next, the control signal generation unit 17 generates a control signal y(t) by multiplying the reference signal generated in step SP16 by the adaptive filter coefficient updated in step SP17, and outputs the control signal y(t) from the speaker 22 (step SP18).

After the process of step SP18 is finished, the active noise control device 1 returns the process to step SP16. That is, the adaptive filter update unit 16 acquires the signal e(t) input to the microphone 21 when the control signal y(t) generated in step SP18 is output from the speaker 22, updates the adaptive filter using the signal e(t) (step SP17), and the control signal generation unit 17 generates the control signal y(t) based on the updated adaptive filter (step SP18).

In the ANC process shown in steps SP16 to SP18, the process for generating a reference signal (step SP16) is performed each time. As a result, the control signal y(t) reflecting the information on the rotational speed of the engine at each time can be generated.

According to the present embodiment, the dip frequency can be accurately detected by dividing the amplitude characteristic A(f) of the secondary path by the smoothed signal A(f)'. In addition, by calculating the correction coefficient α(f) using the result obtained by dividing the amplitude characteristic A(f) by the smoothed signal A(f)' and updating the adaptive filter using the correction coefficient α(f), the noise can be stably controlled even when the frequency of the noise matches the frequency of the dip.

Furthermore, according to the present embodiment, by setting the result of dividing the amplitude characteristic A(f) by the smoothed signal A(f)' as the correction coefficient α(f) when the result is smaller than 1, and setting the correction coefficient α (f) as 1 when the result of dividing the amplitude characteristic A(f) by the smoothed signal A(f)' is greater than or equal to 1, the adaptive filter coefficient can be prevented from greatly changing due to the update.

Furthermore, according to the present embodiment, in the equations (13) and (14) for updating the adaptive filter coefficient, the adaptive filter coefficient can be prevented from becoming too large by multiplying the immediately preceding adaptive filter coefficient by the leakage coefficient γ, which is a positive number close to 1.

Note that, in the present embodiment, the result of dividing the amplitude characteristic A(f) by the smoothed signal A(f)' is set as the correction coefficient α(f) when the result is smaller than 1, and the correction coefficient α (f) is set as 1 when the result of dividing the amplitude characteristic A(f) by the smoothed signal A(f)' is greater than or equal to 1, but the method of obtaining the correction coefficient α(f) is not limited thereto. For example, the correction coefficient α(f) may be set to 0 when the result obtained by dividing the amplitude characteristic A(f) by the smoothed signal A(f)' is less than or equal to a threshold.

Hereinafter, a modified example will be described in which the correction coefficient α(f) is set to 0 when the result obtained by dividing the amplitude characteristic A(f) by the smoothed signal A(f)' is less than or equal to the threshold. Note that this modified example is different only in that the correction coefficient α(f) is set to 0 when the result of dividing the amplitude characteristic A (f) by the smoothed signal A(f)' is less than or equal to the threshold, and there is no change in other processes.

Figure 7:
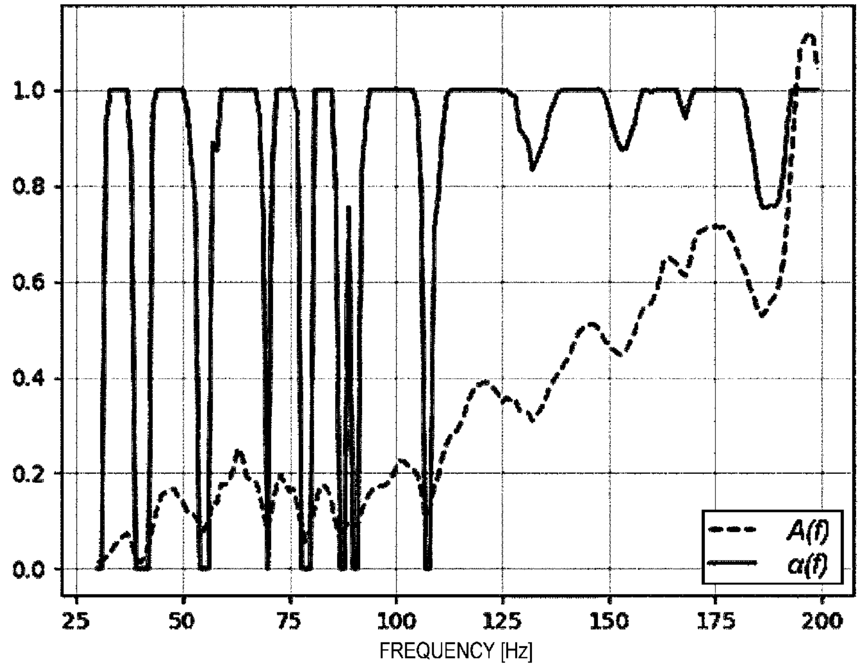
FIG. 7 is a graph showing a relationship between an amplitude characteristic A(f) of a secondary path and a correction coefficient α(f) in a modified example.

FIG. 7 is a graph illustrating a relationship between the amplitude characteristic A(f) of the secondary path and the correction coefficient α(f) when the correction coefficient α(f) is set to 0 in a case where the result obtained by dividing the amplitude characteristic A(f) by the smoothed signal A(f)' is less than or equal to a threshold Th. Similarly to FIG. 5, FIG. 7 illustrates an example in which a sweep wave of 30 Hz to 200 Hz is output from the speaker 22 in the vehicle interior and the threshold Th is set to 0.7. In FIG. 7, a broken line indicates the amplitude characteristic A(f), and a solid line indicates the correction coefficient α(f).

The correction coefficient α(f) is set to 0 at a frequency at which the difference between the amplitude characteristic A(f) and the smoothed signal A(f)' is large in the dip frequency. In other respects, the correction coefficient α(f) shown in FIG. 7 is the same as the correction coefficient α(f) shown in FIG. 5.

In the present embodiment, the threshold Th is set to approximately 0.5 to approximately 0.7. Hereinafter, the threshold Th will be described.

Figure 8:
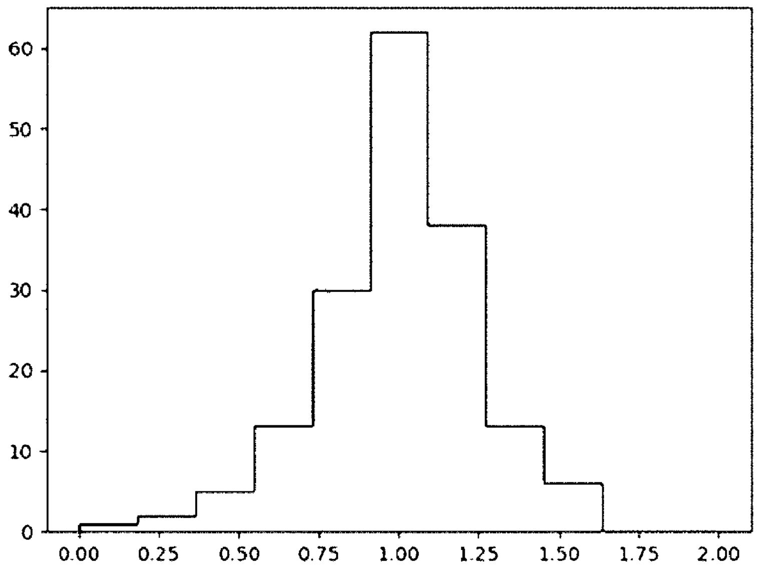
FIG. 8 is a graph showing an example of a distribution of a result obtained by dividing the amplitude characteristic A(f) by the smoothed signal A(f)'.

FIG. 8 is a graph illustrating an example of a distribution of a result obtained by dividing the amplitude characteristic A(f) by the smoothed signal A(f)' in a case where a sweep wave of 30 Hz to 200 Hz is output from the speaker 22 in the vehicle interior. The result of dividing the amplitude characteristic A(f) by the smoothed signal A(f)' is a mountain-shaped distribution having a mode of 1 and one peak. As shown in equation (11), when the result of dividing the amplitude characteristic A(f) by the smoothed signal A(f)' is larger than 1, the correction coefficient α(f) becomes 1, and thus it can be seen from the graph of FIG. 8 that the possibility of the correction coefficient α(f) being 1 is high, and the possibility of the correction coefficient α(f) being less than or equal to 0.5 is low.

Figure 9:
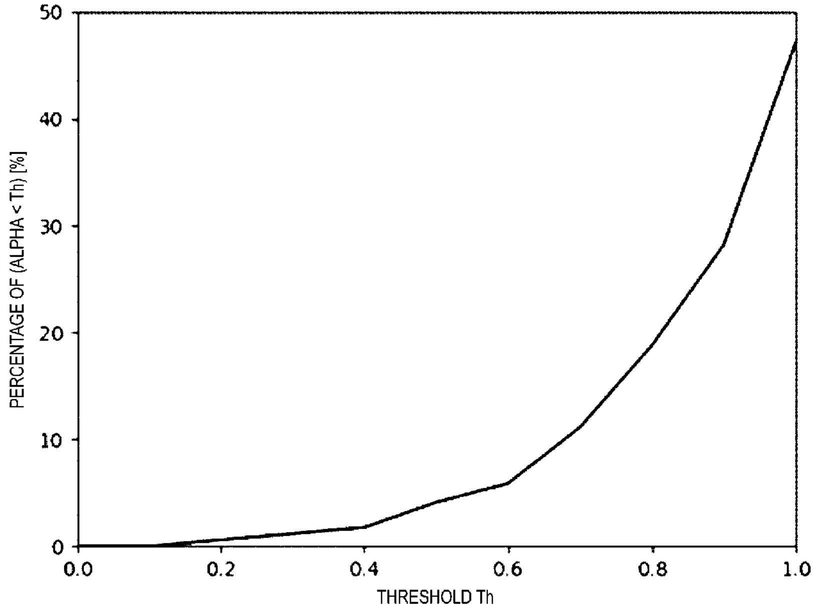
FIG. 9 is a graph showing the relationship between the value of the threshold Th and the percentage at which the correction coefficient α(f) is replaced with 0.

FIG. 9 is a graph illustrating the relationship between the value of the threshold Th and the percentage at which the correction coefficient α(f) is replaced with 0. FIG. 9 is generated based on the histogram shown in FIG. 8. In FIG. 9, the horizontal axis represents the threshold Th, and the vertical axis represents the percentage at which the correction coefficient α(f) is replaced with 0 (i.e., the dip percentage).

When the threshold Th is close to 0, the frequency at which the update of the adaptive filter is stopped decreases, and when the threshold Th is large, the frequency at which the update of the adaptive filter is stopped increases. For example, when the threshold is 1, about approximately 48% is determined to be a dip. As a result, the update of the adaptive filter is suppressed more than necessary.

When the correction coefficient α(f) is extremely small, in order to stop the update of the adaptive filter for a frequency corresponding to a so-called outlier, the percentage of stopping the update of the adaptive filter is desirably set to about 5% to 10%. Referring to FIG. 9, when the threshold Th is set to approximately 0.5 to approximately 0.7, the percentage at which the correction coefficient α(f) is replaced with 0 (the percentage at which the update of the adaptive filter is stopped) is 5% to 10%.

For example, when the threshold Th is 0.7, the correction coefficient α(f) becomes 0 at a frequency of approximately 10% from FIG. 9. Then, as shown in FIG. 7, by setting the correction coefficient α(f) to 0 at a frequency of approximately 10%, the correction coefficient α(f) becomes 0 only at an extreme dip portion.

As described above, in the present modified example, a process prioritizing stability can be performed by stopping the update of the adaptive filter at the dip frequency.

Furthermore, in the present modified example, the adaptive filter coefficient can be gradually reduced when the correction coefficient α(f) becomes 0, and the adaptive filter coefficient can be ultimately set to 0 by multiplying the immediately preceding adaptive filter coefficient by the leakage coefficient γ, which is a positive number close to 1, in the equations (13) and (14) for updating the adaptive filter coefficient. If the adaptive filter coefficient is set to 0 at the same time that the correction coefficient α(f) is set to 0, a discontinuous sound such as "pop" occurs or a sudden change in volume occurs, resulting in an unnatural sound. On the other hand, in the present modified example, the unnaturalness can be eliminated by multiplying the immediately preceding adaptive filter coefficient by the leakage coefficient γ to gradually reduce the adaptive filter coefficient.

The embodiments of the invention are described above in detail with reference to the drawings. However, specific configurations are not limited to the embodiments and also include changes in design or the like without departing from the gist of the invention.

REFERENCE SIGNS LIST

1: active noise control device
11: reference signal generation unit
12: storage unit
13: amplitude characteristic calculation unit
14: smoothed signal generation unit
15: correction coefficient calculation unit
16: adaptive filter update unit
17: control signal generation unit
18: speaker amplifier
21: microphone
22: speaker
25: CAN
100: vehicle
101: vehicle interior

The invention claimed is:

1. An active noise control device comprising:

a microphone and a speaker;

an adaptive filter that generates a control signal by performing signal processing on a reference signal generated based on a vibration frequency generated by a vibration source, and sequentially updating the adaptive filter based on a signal input from the microphone when the control signal is output from the speaker;

a reference signal generation unit that generates the reference signal;

an amplitude characteristic calculation unit that acquires an acoustic characteristic including amplitude and phase information, the acoustic characteristic being an acoustic characteristic of a secondary path between the speaker and the microphone, and calculates an amplitude characteristic of the secondary path having a different value according to a first frequency based on the acquired acoustic characteristic;

a smoothed signal generation unit having a low-pass filter, that smooths the amplitude characteristic using the low-pass filter and generates a smoothed signal having a different value according to a second frequency;

a correction coefficient calculation unit that calculates a correction coefficient having a different value according to a third frequency based on a result of dividing the amplitude characteristic by the smoothed signal;

an adaptive filter update unit that updates the adaptive filter by subtracting an update term including the correction coefficient from a first adaptive filter coefficient that is an immediately preceding adaptive filter coefficient to obtain a second adaptive filter coefficient; and a control signal generation unit that generates the control signal by multiplying the reference signal by the second adaptive filter coefficient.

2. The active noise control device according to claim 1, wherein the adaptive filter update unit includes a threshold value set to 0.5 to 0.7; and the adaptive filter update unit sets the correction coefficient to 0 when the correction coefficient is less than or equal to the threshold.

3. The active noise control device according to claim 1, wherein the adaptive filter update unit subtracts the update term from a result obtained by multiplying the first adaptive filter coefficient by a coefficient of less than 1 to obtain the second adaptive filter coefficient.

4. The active noise control device according to claim 1, wherein the correction coefficient calculation unit sets a result of dividing the amplitude characteristic by the smoothed signal as the correction coefficient when the result is smaller than 1, and sets the correction coefficient to 1 when the result of dividing the amplitude characteristic by the smoothed signal is greater than or equal to 1.

5. An active noise control method comprising:

preparing an adaptive filter that generates a control signal by performing signal processing on a reference signal generated based on a vibration frequency generated by a vibration source, and sequentially updating the adaptive filter based on a signal input from a microphone when the control signal is output from a speaker, the active noise control method comprising the steps of:

acquiring an acoustic characteristic including amplitude and phase information, the acoustic characteristic being an acoustic characteristic of a secondary path between the speaker and the microphone, and calculating an amplitude characteristic of the secondary path having a different value according to a first frequency based on the acquired acoustic characteristic;

smoothing the amplitude characteristic using a low-pass filter and generating a smoothed signal having a different value according to a second frequency;

calculating a correction coefficient having a different value according to a third frequency based on a result of dividing the amplitude characteristic by the smoothed signal;

updating the adaptive filter by subtracting an update term including the correction coefficient from a first adaptive filter coefficient that is an immediately preceding adaptive filter coefficient to obtain a second adaptive filter coefficient; and generating the control signal by multiplying the reference signal by the second adaptive filter coefficient.

6. A non-transitory computer readable medium storing a program that causes a computer of an active noise control to control a noise using an adaptive filter that generates a control signal by performing signal processing on a reference signal generated based on a vibration frequency generated by a vibration source, and sequentially updating the adaptive filter based on a signal input from a microphone when the control signal is output from a speaker, the computer executing the steps of:

acquiring an acoustic characteristic including amplitude and phase information, the acoustic characteristic being an acoustic characteristic of a secondary path between the speaker and the microphone, and calculating an amplitude characteristic of the secondary path having a different value according to a first frequency based on the acquired acoustic characteristic;

smoothing the amplitude characteristic using a low-pass filter and generating a smoothed signal having a different value according to a second frequency;

calculating a correction coefficient having a different value according to a third frequency based on a result of dividing the amplitude characteristic by the smoothed signal;

updating the adaptive filter by subtracting an update term including the correction coefficient from a first adaptive filter coefficient that is an immediately preceding adaptive filter coefficient to obtain a second adaptive filter coefficient; and generating the control signal by multiplying the reference signal by the second adaptive filter coefficient.

* * * * *